(12) United States Patent  (10) Patent No.: US 7,291,578 B2
SenGupta et al.  (45) Date of Patent: Nov. 6, 2007

(54) HYBRID ANION EXCHANGER FOR SELECTIVE REMOVAL OF CONTAMINATING LIGANDS FROM FLUIDS AND METHOD OF MANUFACTURE THEREOF

(75) Inventors: Arup K. SenGupta, 3286 Marchant Dr., Bethlehem, PA (US) 18017; Luis H. Cumbal, Quito (EC)

(73) Assignee: Arup K. SenGupta, Bethlehem, PA (US)

( * ) Notice: Subject to any disclaimer, the term of this patent is extended or adjusted under 35 U.S.C. 154(b) by 487 days.

(21) Appl. No.: 10/925,600

(22) Filed: Aug. 24, 2004

(65) Prior Publication Data

US 2005/0156136 A1    Jul. 21, 2005

Related U.S. Application Data

(60) Provisional application No. 60/538,131, filed on Jan. 21, 2004.

(51) Int. Cl.
*B01J 20/26* (2006.01)
(52) U.S. Cl. .................. 502/402; 502/406; 210/683
(58) Field of Classification Search ............. 502/402, 502/406; 210/683
See application file for complete search history.

(56) References Cited

U.S. PATENT DOCUMENTS 3,984,313 A   10/1976   Higgins 5,397,477 A * 3/1995   Salem et al. ............... 210/683
5,453,201 A   9/1995   Etzel et al.

OTHER PUBLICATIONS

M.J. Demarco, A.K. Sengupta and J.E. Greenleaf, Arsenic removal using a polymeric/inorganic hybrid sorbent, Water Research, 37 (2003), 164-176, available on-line Oct. 29, 2002.
J.M. Min and J. Hering, Water Research, 32 (1998), 1544-1552.
A. Ramana and A.K. Sengupta, J. Environ. Eng. Div. ASCE. 118 (1992), 755-775.
B.A. Manning, S.E. Fendorf and S.E. Goldberg, Environ. Sci. Technol., 32 (1998), 2383-2388.

* cited by examiner

*Primary Examiner*—Chester T. Barry
(74) *Attorney, Agent, or Firm*—Howson & Howson LLP

(57) ABSTRACT

Polymeric anion exchangers are used as host materials in which hydrated Fe(III) Oxides (HFO) are irreversibly dispersed within the exchanger beads. Since the anion exchangers have positively charged quaternary ammonium functional groups, anionic ligands such as arsenates, chromates, oxalates, phosphates, phthalates can permeate in and out of the gel phase and are not subjected to the Donnan exclusion effect. Consequently, anion exchanger-supported HFO micro particles exhibit significantly greater capacity to remove arsenic and other ligands in comparison with cation exchanger supports. Loading of HFO particles is carried out by preliminary loading of the anion exchange resin with an oxidizing anion such as $MnO_4^-$ or $OCl^-$, followed by passage of a Ferrous Sulfate solution through the resin.

15 Claims, 19 Drawing Sheets

Solid  Interface  Water

HYBRID ANION EXCHANGER FOR SELECTIVE REMOVAL OF CONTAMINATING LIGANDS FROM FLUIDS AND METHOD OF MANUFACTURE THEREOF

CROSS-REFERENCE TO RELATED APPLICATION

This application claims priority from provisional application 60/538,131, filed Jan. 21, 2004.

FIELD OF THE INVENTION

The invention relates to the manufacture and application of hybrid anion exchangers for selective removal of contaminants from fluids.

BACKGROUND OF THE INVENTION

It is universally recognized that a fixed-bed sorption process is operationally simple, requires virtually no start-up time, and is forgiving toward fluctuations in feed compositions. However, in order for a fixed-bed process to be viable and economically competitive, the sorbent must exhibit high selectivity toward the target contaminant, must be durable, and must be amenable to efficient regeneration and reuse.

Ideally, the removal of the target contaminant should not cause major changes in pH or in the composition of the influent water. In this regard, both amorphous and crystalline Hydrated Fe Oxide (HFO) show strong sorption affinity toward both As(III) and As(V) oxyacids and oxyanions through ligand exchange in the coordination spheres of structural Fe atoms. Recent investigations using extended X-ray absorption fine structure spectroscopy (EXAFS) confirmed that As(III) and As(V) species are selectively bound to the oxide surface through formation of inner-sphere complexes. HFO particles also exhibit high sorption affinities toward phosphate, natural organic matters, selenite and other anionic ligands. FIG. 1 shows an illustration of the binding of various solutes onto hydrated Fe(III) oxides or HFO. Commonly encountered competing ions, such as chloride or sulfate can be sorbed only through Coulombic interaction or formation of outer-sphere complexes. Thus, they exhibit poor sorption affinity toward HFO particles. In comparison, ligands such as arsenite, monovalent arsenate, divalent arsenate, phosphate, etc. are sorbed strongly through Lewis acid-base interaction or formation of inner-sphere complexes.

The traditional process of syntheses, although straightforward, produces only very fine submicron HFO particles which are unusable in fixed beds, permeable reactive barriers, or any flow-through systems, because of excessive pressure drops, poor mechanical strength and unacceptable durability. In order to overcome this problem, strong-acid cation exchangers have previously been modified to dope/disperse HFO particles for removal of arsenic. Iron-loaded cation exchange resins and alginates have also been tried for the removal of selenium and arsenic oxyanions. Although cation exchanger-loaded hydrated Fe(III) oxide (HFO) particles are capable of removing arsenates or phosphates, their removal capacities are reduced because the gel phase of the cation exchanger is negatively charged due to the presence of sulfonic acid groups. Consequently, arsenates or As(V) oxyanions and phosphates are rejected due to the Donnan co-ion exclusion effect, and dispersed HFO particles in the gel phase are not accessible to dissolved anionic ligands for selective sorption.

When macroporous cation exchangers were used as the host materials, arsenic removal capacity was not high, but on the order of 750 μg As/g of sorbent. However, when a gel-type cation exchanger was used for dispersing HFO particles, the resulting material was ineffective altogether.

FIG. 2 shows a column run effluent history where a gel-type cation exchanger was loaded with eight percent HFO present as Fe. Arsenic breakthrough took place almost immediately. Thus, the material had practically no arsenic removal capacity. We have observed that HFO particles, when encapsulated within cation exchange sites as illustrated in FIG. 3, are not accessible to arsenates or other anionic ligands for selective sorption. However dispersion of HFO particles within a cation exchanger material is a relatively straightforward process.

Objects of the invention, therefore, are to provide a novel and more effective medium for the selective removal of arsenic species and other ligands from aqueous solutions, and to provide a method for effectively loading hydrated iron oxides onto an anion exchange resin.

BRIEF SUMMARY OF THE INVENTION

Unlike cation exchangers, anion exchangers have fixed positively charged functional groups. Thus, anionic ligands can easily permeate in and out of the gel phase without encountering the Donnan co-ion exclusion effect. If HFO particles are dispersed within a polymeric anion exchanger bead, arsenic or ligand removal capacity can be significantly increased. On the other hand, forming hydrated Fe(III) oxides within an anion exchange resin poses a major challenge due to positively charged quaternary ammonium functional groups. Consequently, heretofore, no way was known to achieve successful dispersion of HFO particles within a polymeric anion exchanger.

The synthesis of a selective adsorbent in accordance with the invention comprises the steps of reacting a material that exhibits anion exchange behavior with an anionic oxidant to produce an intermediate, and reacting, with the intermediate, a solution of a metal salt capable of being oxidized, thereby precipitating and dispersing a salt of the metal throughout the intermediate by the action of the oxidant, and producing an adsorbent.

The step of reacting the material that exhibits anion exchange behavior with an anionic oxidant is preferably carried out by passing a solution of the anionic oxidant through the material. The step of reacting a solution of a salt of a metal with the intermediate is carried out by passing a solution of the salt through the intermediate, thereby oxidizing the metal, and causing precipitation and dispersion of another salt, in which the metal is in a higher oxidation state than in the original salt. The step of reacting a solution of a metal salt with the intermediate may be followed by the step of washing the adsorbent with an organic solvent, preferably acetone, and then drying the adsorbent.

In preparing the adsorbent, improved results may be realized by repeating the steps of reacting a material that exhibits anion exchange behavior with an anionic oxidant, and reacting a solution of a salt of a metal with the intermediate.

The material that exhibits anion exchange behavior is preferably a polymeric anion exchange resin, and may comprise weak base organic ion exchange resin beads containing primary, secondary or tertiary amine groups or a mixture thereof. Alternative preferred materials are strong base organic ion exchange resin beads containing quaternary ammonium groups with a positively charged nitrogen atom, and organic ion exchange resin beads having a polystyrene or polystyrene/divinylbenzene matrix.

The preferred metal salt is a solution of ferrous salt, and the preferred anionic oxidant is a permanganate, or a hypochlorite.

The adsorbent thus produced comprises a polymeric anion exchange resin containing dispersed particles of an oxygen-containing compound of iron, and is capable of selective removal of ligands from a fluid stream brought into contact with the adsorbent. The adsorbent is especially effective in removing ligands such as arsenates, arsenites, chromates, molybdates, selenites, and vanadates from a stream of drinking water, groundwater, industrial process water or industrial effluent.

In a preferred embodiment, an adsorbent bed for the selective removal of ligands from the aqueous solution is prepared by passing a solution containing an oxidizing anion such as a permanganate, persulfate or hypochlorite, through a bed of polymeric anion exchange resin. Thereafter a solution of a ferrous salt, such as ferrous sulfate, is passed through the bed, thereby simultaneously desorbing the oxidizing anion and oxidizing the ferrous ion to a ferric ion. This causes precipitation, and uniform dispersion, of a solid, hydrated ferric oxide, within the polymeric anion exchange resin. Anionic ligands such as arsenates, chromates, oxalates, phosphates, phthalates, etc., can permeate in and out of the gel phase and are not subjected to the Donnan exclusion effect. Consequently, anion exchanger-supported HFO micro particles exhibit significantly greater capacity, in comparison with cation exchanger-supported particles, for removal of arsenates, arsenites, and other arsenic oxyanions, as well as other ligands.

Another advantage of the invention is that the physical properties of the anion exchange material can supply structural integrity to materials that are otherwise friable and weak. Thus, by dispersion of HFO particles into anion exchange materials, it is possible to synthesize a bed that exhibits superior materials properties when compared to HFO particles that, by themselves are subject to granulation and agglomeration. The improved physical robustness afforded by the use of an anion exchange material allows for use of HFO particles under more demanding conditions such as higher pressures, increased flow, etc. The improved physical robustness of the hybrid material also allows for effective regeneration and reuse of the bed, and reduces the need for backwashing and other maintenance measures common in the treatment of streams with hydrous metal oxides that are not supported by substrates.

Other objects, details and advantages of the invention will be apparent from the following detailed description when read in conjunction with the drawings.

DETAILED DESCRIPTION OF THE PREFERRED EMBODIMENTS

Since $Fe^{3+}$ and $Fe^{2+}$ are cations, they are repelled by an anion exchanger's positively charged functional groups and cannot be loaded onto anion exchange resins. Thus, the technique, used previously for dispersing HFO particles within cation exchanger beads, is not applicable when anion exchanger beads serve as the host materials. We have discovered, however, that HFO particles can be supported in anion exchanger by a series of steps, a preferred example of which is as follows.

As a first step, Permanganate anion ($MnO_4^-$) is loaded onto an anion exchange resin (for example A-500P, an anion exchange resin with quaternary ammonium functional groups in chloride form, available from The Purolite Company of Bala Cynwyd, Pa.). The loading of the resin with permanganate anion is carried out by passing potassium permanganate solution (500 mg/L KMnO$_4$) through the bed. This may be carried out, for example by passing a 500 mg/L KMnO$_4$ solution through the bed to achieve the following reaction:

$$R(CH_3)_3N^+Cl^- + MnO_4^- \leftrightarrow R(CH_3)_3N^+MnO_4^- + Cl^-$$

R(CH$_3$)$_3$N$^+$Cl$^-$ is an anion exchange resin with a quaternary ammonium functional group in chloride form.

Anion exchange resins from other manufacturers may of course be used. Particles sizes of the anion exchange resins are preferably in the range from 300 μm to 1000 μm.

The second step is concurrent permanganate desorption, Fe(II) oxidation and HFO formation within the anion exchanger. During this step, the permanganate loaded anion exchanger is brought into contact with 5% ferrous sulfate solution. Desorption of MnO$_4^-$ by sulfate, reduction of MnO$_4^-$ to MnO$_2$(s) and oxidation of Fe$^{2+}$ to Fe$^{3+}$ and finally, precipitation of Fe(OH)$_3$(s) within the anion exchanger beads, took place in accordance with the following:

MnO$_4^-$ desorption:

$$2R(CH_3)_3N^+MnO_4^- + SO_4^{2-} \leftrightarrow [R(CH_3)_3N^+]_2SO_4^{2-} + 2MnO_4^-$$

Fe(II) oxidation and formation of Ferric Hydroxide:

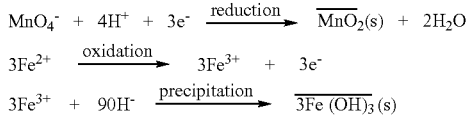

$$MnO_4^- + 4H^+ + 3e^- \xrightarrow{reduction} \overline{MnO_2}(s) + 2H_2O$$
$$3Fe^{2+} \xrightarrow{oxidation} 3Fe^{3+} + 3e^-$$
$$3Fe^{3+} + 9OH^- \xrightarrow{precipitation} \overline{3Fe(OH)_3}(s)$$

over: MnO$_4^-$+3Fe$^{2+}$+2H$_2$O+5OH$^-$→MnO$_2$(S)+3Fe(OH)$_3$(S)

(The Overbars and (s) Denote Solid Phase.)

The third step is an acetone wash and drying. Anion exchanger beads from the second step are washed with acetone and dried in a furnace at 35° C. for twelve hours.

Figure 1:
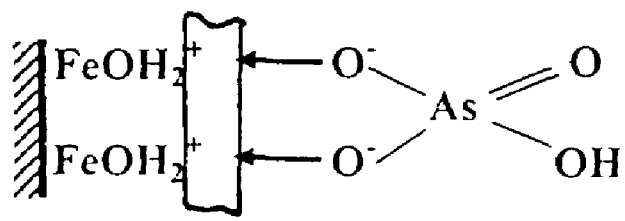
FIG. 1 is a schematic diagram illustrating the binding of various solutes onto hydrated Fe(III) oxides.
Figure 1:
Figure 1:
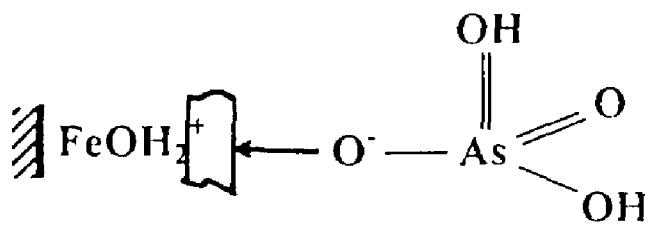
Figure 1:
Figure 1:
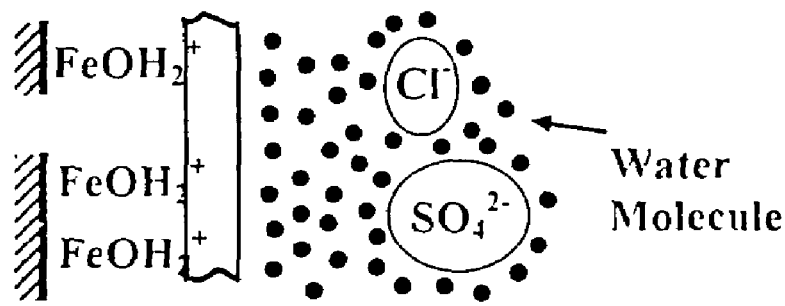
Figure 1:
Figure 1:
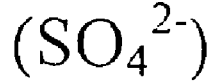
Figure 1:
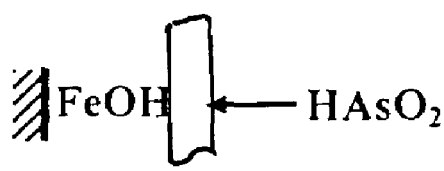
Figure 1:
Figure 1:
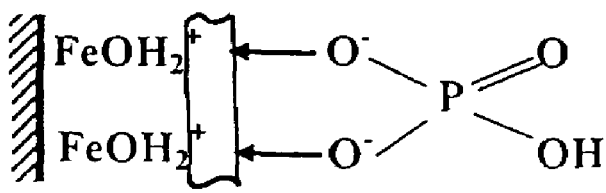
Figure 1:
Figure 2:
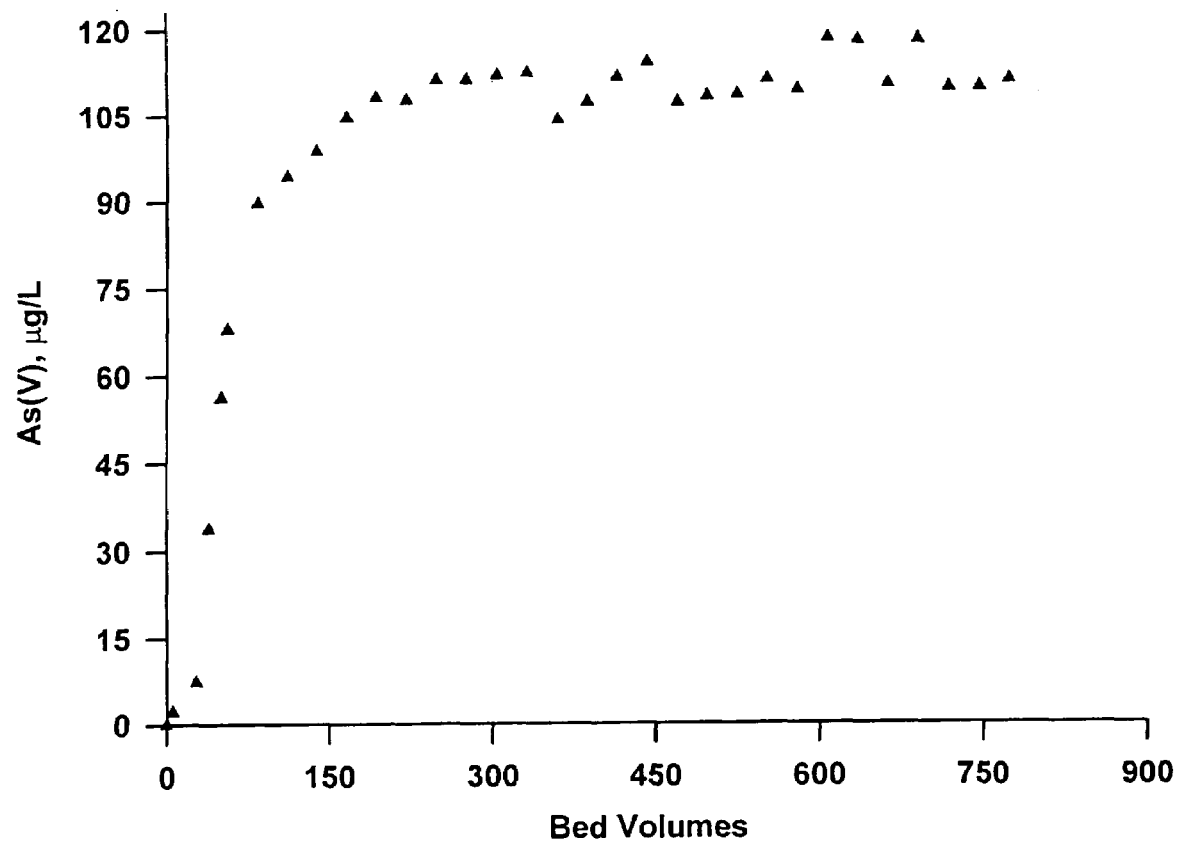
FIG. 2 is a graph of the effluent history for arsenic during a column run using a hybrid cation exchanger gel.
Figure 3:
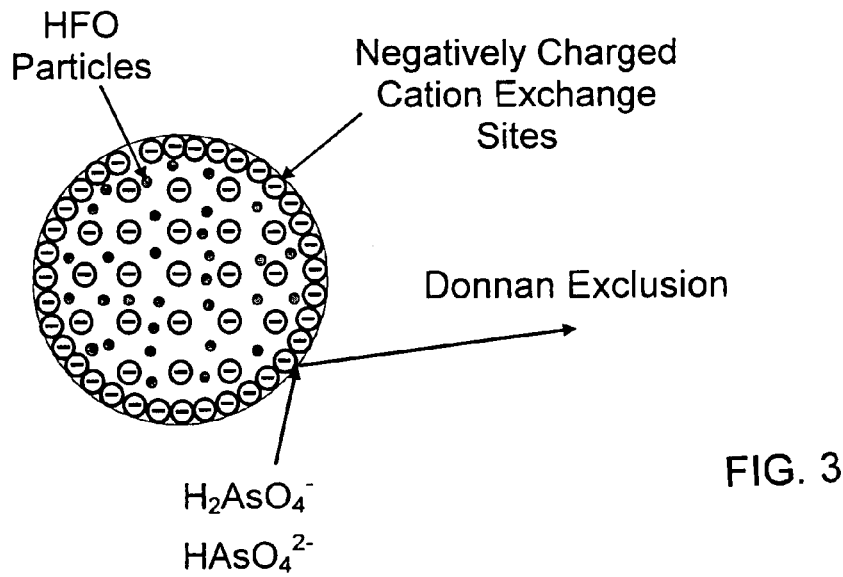
FIG. 3 is a schematic diagram illustrating why an HFO doped cation exchange resin is unable to offer significant arsenic sorption capacity.
Figure 4A:
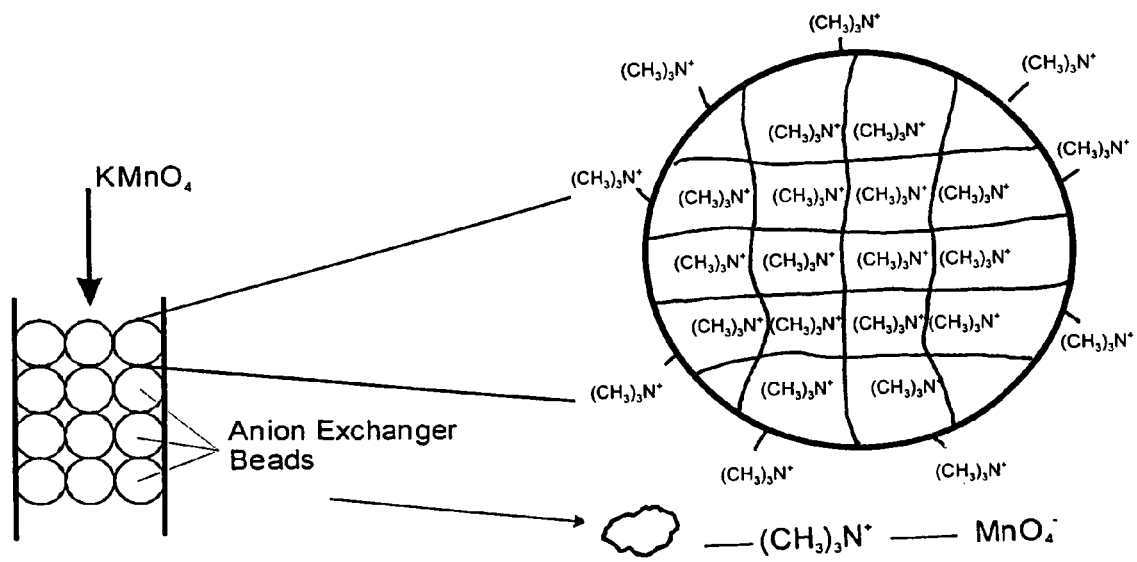
FIGS. 4(a) and 4(b) are schematic diagrams illustrating first and second steps in the preparation of a hybrid anion exchanger sorbent.
Figure 4B:
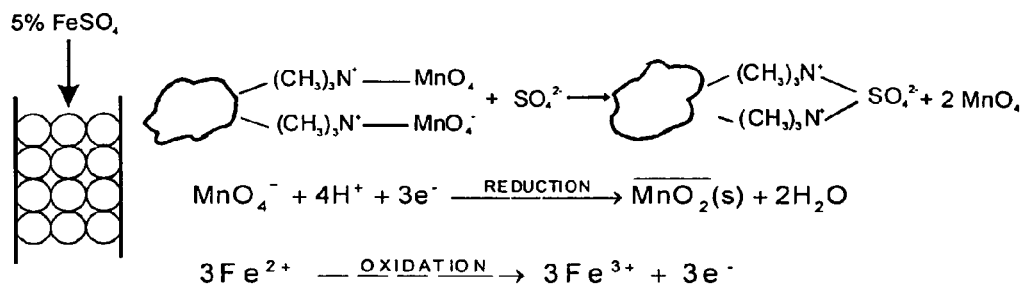

The major steps of the process, that is, the first and second steps, are depicted in FIGS. 4A and 4B. These steps can be repeated to achieve greater Fe(III) loading. Also, the manganese content within the anion exchanger decreases with multiple cycles, and this is a desirable phenomenon from an application viewpoint. During the third step, the use of acetone reduced the dielectric constant of the water and enhanced the agglomeration of HFO submicron particles through suppression of surface charges. HFO agglomerates were irreversibly encapsulated within the spherical anion exchanger beads. Turbulence and mechanical stirring do not result in any noticeable loss of HFO particles.

Figure 5A:
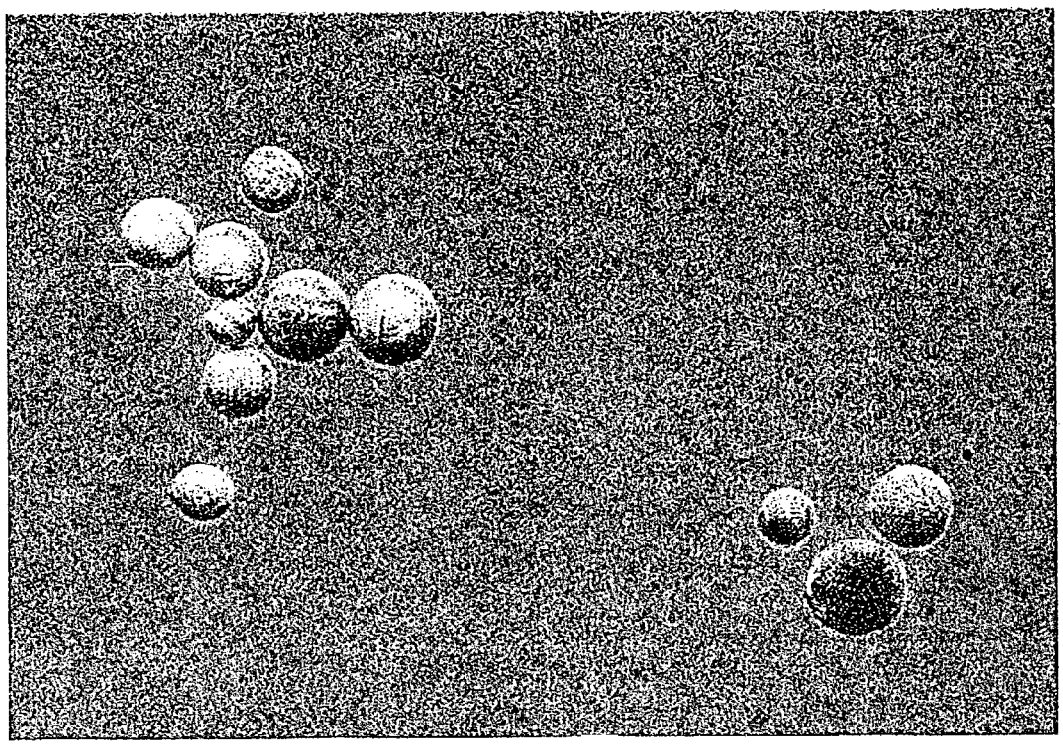
FIGS. 5(a), 5(b) and 5(c) are respectively a photograph of macroporous, hybrid anion exchange sorbent particles, a scanning electron microphotograph of a sliced parent polymer bead, and a scanning electron microphotograph of a sliced hybrid anion exchange bead.
Figure 5B:
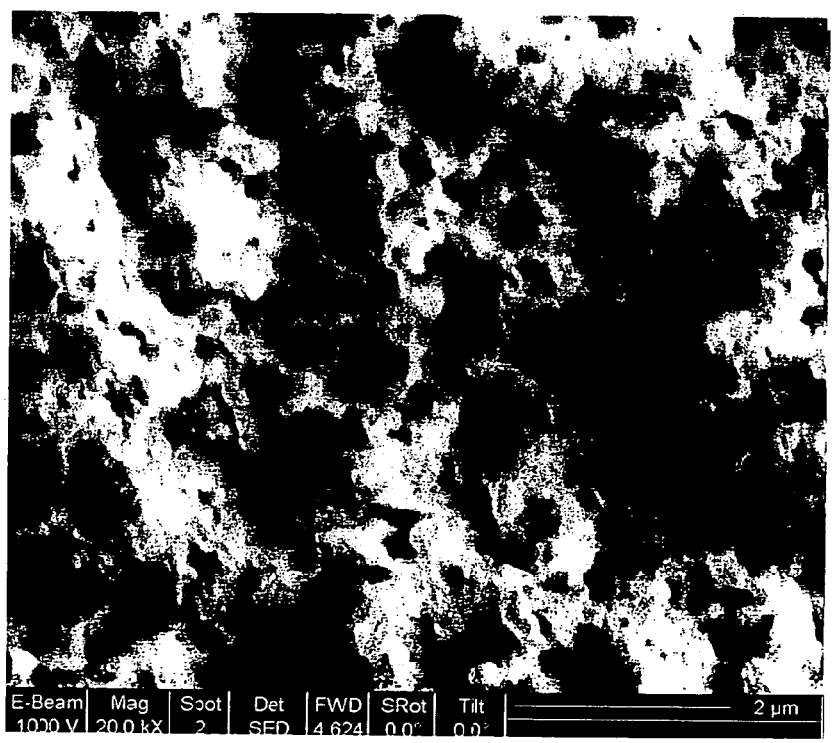
Figure 5C:
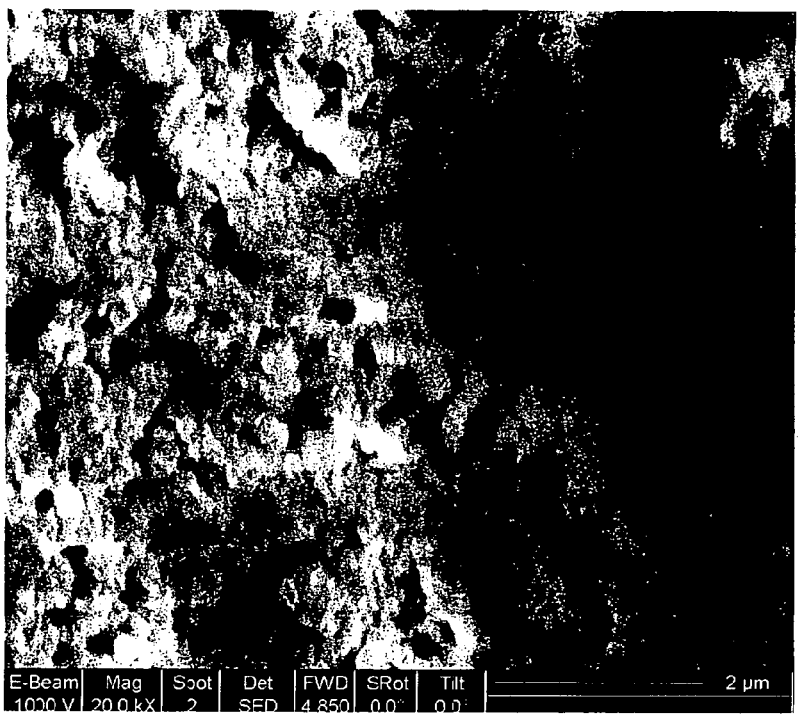

Both gel and macroporous anion exchanger beads (Purolite A-400 and A-500P) were used in our study. Mass loading of HFO onto the anion exchanger varied from 10-15% as Fe; the manganese content was less than 1% by mass as Mn. FIG. 5A shows Hybrid Anion Exchanger (HAIX) particles. FIG. 5B is a scanning electron microphotograph (SEM) of a sliced parent polymer bead, in which the presence of macropores can be readily observed. FIG. 5C shows a sliced HAIX particle containing HFO nanoparticles.

While the polymeric anion exchanger beads exhibit excellent hydraulic properties and durability during fixed-bed column runs, the dispersed HFO microparticles serve as active sorbents for target ligands.

By way of example, details of the steps carried out in a typical laboratory synthesis of hybrid anion exchanger particles are as follows.

In a 4.0 liter container filled with 500 mg/L solution of potassium permanganate, 30 g of Purolite anion exchanger resin were immersed the solution for 30 minutes with intermittent stirring. The resin loaded with permanganate was rinsed twice with deionized water. Thereafter, the permanganate-loaded resin was immersed in 1.0 liter of 5.0% (w/v) ferrous sulfate solution and shaken for four hours. The modified resin (hybrid anion exchanger) was then rinsed several times with deionized water. These steps were repeated for a second and third cycle of iron loading. Following each cycle, a sample of about 50 mg of the hybrid anion exchanger was taken for iron and manganese content analysis.

The hybrid resin was rinsed with deionized water and acetone, and then dried in an oven at 35° C. for 12 hours. Both macroporous and gel-type anion exchangers from The Purolite Company, namely, Purolite A-500P and A-400, were used as the parent materials. The iron and manganese loading of HAIX particles were found by digesting twice with 10% sulfuric acid for 24 hours at room temperature. The iron and manganese values at the end of each cycle of preparation were as follows:

HAIX-M (Macroporous Parent Resin)

| Cycle | Iron content* (mg/g of hybrid anion exchanger) | Manganese content* (mg/g of hybrid anion exchanger) |
|---|---|---|
| 1 | 57.3 | 31.3 |
| 2 | 130.1 | 5.0 |
| 3 | 162.0 | 1.2 |

For HAIX-G (Gel Parent Resin)

| Cycle | Iron content* (mg/g of hybrid anion exchanger) | Manganese content* (mg/g of hybrid anion exchanger) |
|---|---|---|
| 1 | 35.0 | 4.5 |
| 2 | 52.2 | 0.8 |
| 3 | 60.0 | 0.2 |

*Based on dried hybrid anion exchanger beads

Approximately ten different batches of HAIX-M and five different batches of HAIX-G have been synthesized. The iron content for HAIX-M after three cycles varied between 120-175 mg Fe/g, while the iron content for HAIX-G was between 70-100 mg Fe/g.

It was observed that the white color of the macroporous anion exchange resin changed to purple during loading with permanganate (MnO$_4^-$) ion. Following the addition of ferrous sulfate solution, the purple color of the resin gradually changed to light brown. A uniform light brown color characterizes the completion of hydrated ferric oxide or HFO formation within the resin beads. Approximately four hours are needed for this step to be completed.

Laboratory tests were conducted to prepare HAIX using sodium hypochlorite (NaOCl) solution following the same experimental protocol. By way of example, details of the steps carried out in laboratory synthesis of hybrid anion exchanger particles using hypochlorite ions ($OCl^-$) are as follow.

In a 4.0 liter container filled with 500 mg/L of NaOCl solution, 30 g of macroporous anion exchanger resin were immersed into the NaOCl solution for 30 min with intermittent stirring. The resin loaded with hypochlorite anion was then rinsed twice with deionized water. The hypochlorite-loaded resin was then immersed in 1.0 L of 5.0% (w/v) ferrous sulfate solution and shaken for four hours. The modified resin (hybrid anion exchanger) was then rinsed several times with deionized water.

The above steps were repeated for a second and third cycle of iron loading. Following each cycle, a sample of about 50 mg of the hybrid anion exchanger was taken for iron content analysis.

The hybrid resin was rinsed with deionized water and acetone, and then dried in an oven at 35° C. for 12 hours. The iron loading was found to be as follows:

| Cycle | Iron Content* (mg/g of hybrid anion exchanger) |
|---|---|
| 1 | 10.0 |
| 2 | 25.0 |
| 3 | 40.0 |

*Based on dried hybrid anion exchanger beads.

Since the iron loading was significantly less with hypochlorite than with permanganate, the performance evaluation of HAIX during fixed-bed column runs and other sorption studies were carried out on products obtained using permanganate as oxidizing agent.

In the evaluation of the performance of HAIX the following experimental protocol was used.

Figure 6:
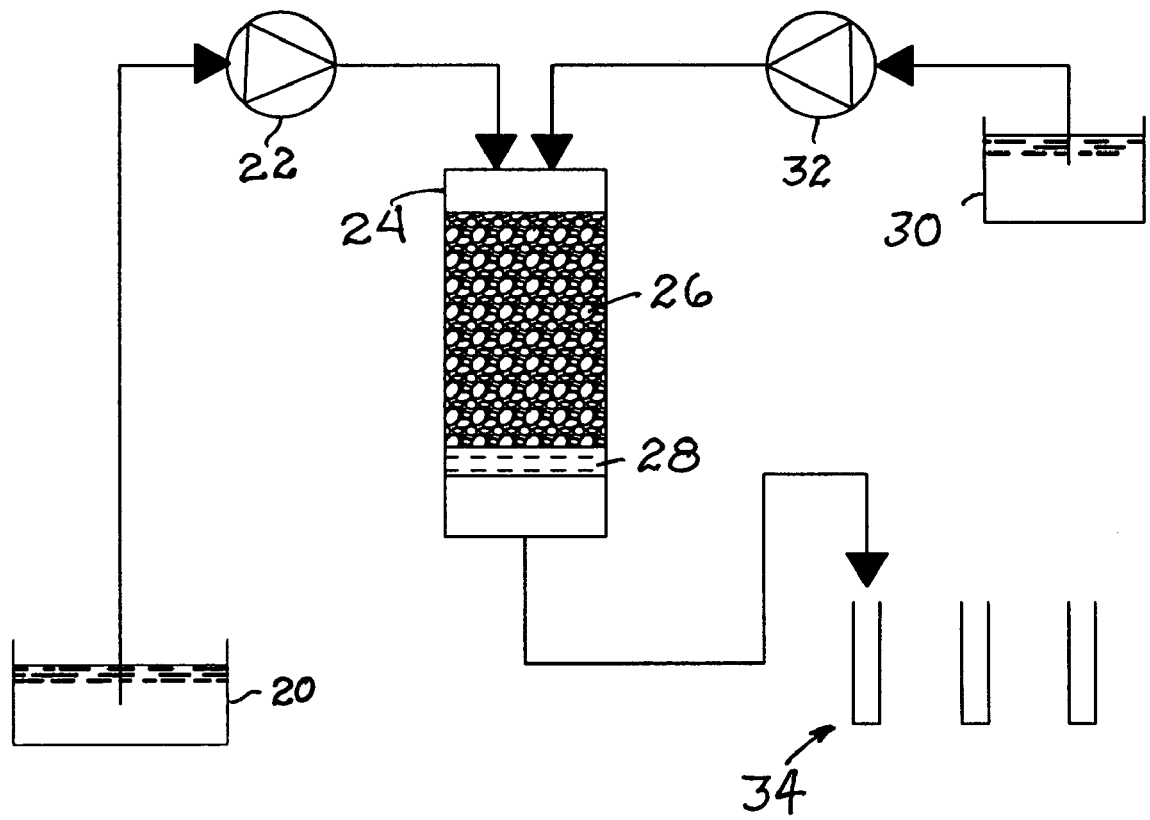
FIG. 6 is a schematic diagram of a set-up for fixed bed column runs and regeneration tests.

A series of fixed-bed experiments were carried out to evaluate the As(III) and As(V) removal capacities of HAIX. The experimental set-up is illustrated in FIG. 6, where contaminated water from a reservoir 20 was pumped by a pump 22 into a column 24 containing HAIX beads 26 over a glass fiber layer 28. Regenerant in reservoir 30 was pumped into the column by pump 32. The effluent was collected in effluent sample tubes 34.

Figure 7A:
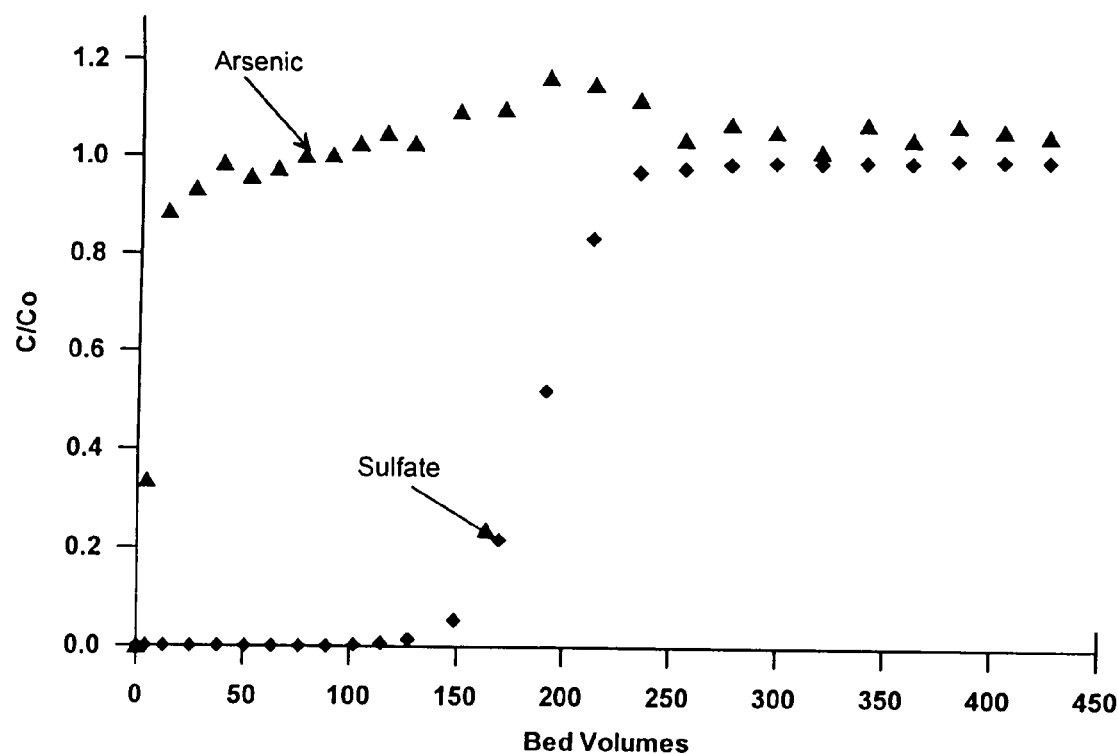
FIG. 7(a) is a graph showing the effluent histories for sulfate and arsenic during a column run with a parent anion exchanger in chloride form, showing early arsenic breakthrough.
Figure 7B:
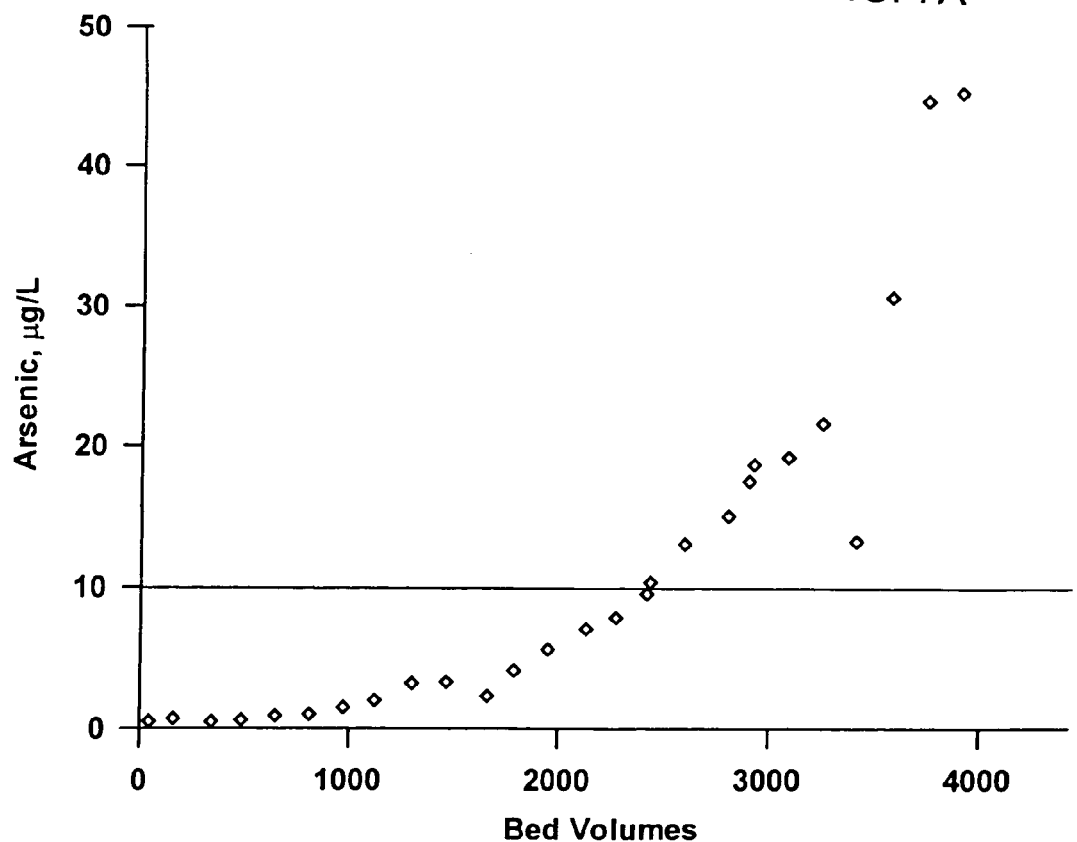
FIG. 7(b) is a graph of the effluent history for arsenic during a column run using a macroporous hybrid cation exchanger.
Figure 7C:
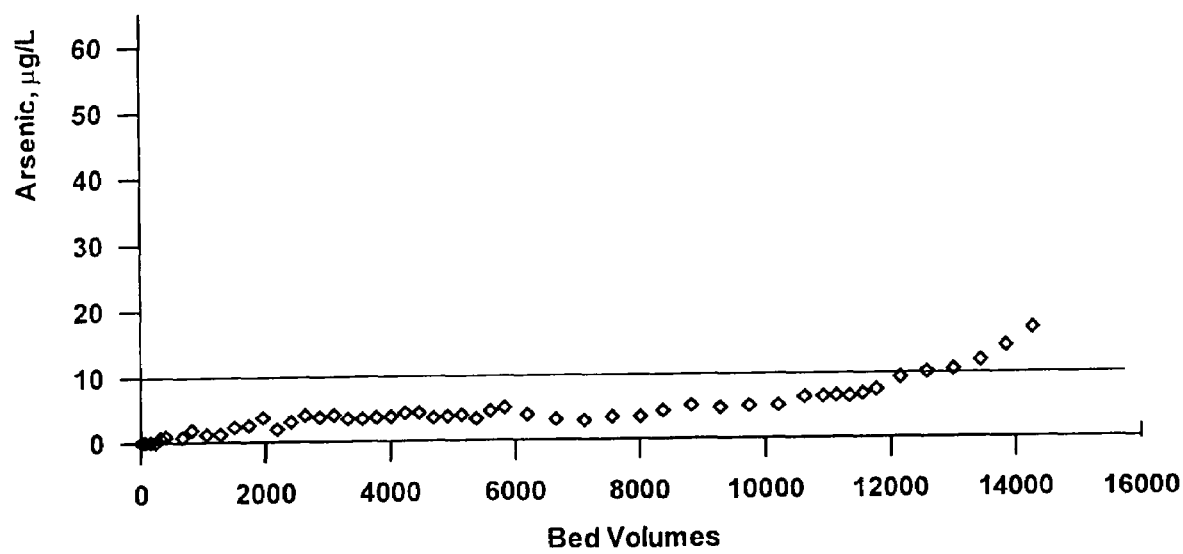
FIG. 7(c) is a graph of the effluent history for arsenic during a column run using a macroporous hybrid anion exchanger.

Using this test set-up, tests were also conducted to validate the ability of HAIX to remove chromate, phosphate and natural organic matter. The following results are noteworthy:

FIGS. 7A-7C provide As(III) effluent histories for three separate column runs under nearly identical conditions using respectively Parent Anion Exchanger Purolite A-500P in chloride form in FIG. 7A, HFO loaded macroporous cation exchanger in FIG. 7B, and Hybrid Anion Exchanger or HAIX in FIG. 7C. The abscissa (C/Co) represents the fraction of the influent concentration present at the exit of the column.

As shown in FIG. 7A, the parent anion exchanger was unable to remove As(III). The empty bed contact time (EBCT) was 4.5 minutes. The influent solution contained 100 µg/L As(III), 170 mg/L $SO_4^{2-}$, 90 mg/L $Cl^-$, 100 mg/L $HCO_3^-$, and had a pH of 6.2. Arsenic broke through immediately, and long before the sulfate breakthrough.

As shown in FIG. 7B, the HFO loaded cation exchanger removed As(III) over more than 2000 bed volumes, with a breakthrough concentration of 10 µg/L at about 2500 bed volumes. In this case, the EBCT was 3.1 minutes. The influent solution contained 100 µg/L As(III), 122 mg/L $SO_4^{2-}$, 70 mg/L $Cl^-$, 100 mg/L $HCO_3^-$, and had a pH of 7.2.

In the experiment depicted in FIG. 7C, the experimental parameters were the same as in FIG. 7A. That is, the EBCT was 4.5 minutes, and the e influent solution contained 100 µg/L As(III), 170 mg/L $SO_4^{2-}$, 90 mg/L $Cl^-$, 100 mg/L $HCO_3^-$, and had a pH of 6.2. As illustrated in FIG. 7C, the HAIX, or HFO loaded anion exchanger, treated nearly 12,000 bed volumes of contaminated feed water before the arsenic concentration in the effluent reached 10 µg/L. The HAIX-M (Macroporouse hybrid anion exhanger offered a six-fold greater As(III) removal capacity over the HCIX-M (Macroporous hybrid cation exchanger).

To validate the hypothesis that the Donnan Co-ion exclusion effect in the host material significantly influences the arsenic removal capacity of hydrated iron oxide particles, one gel-type cation exchanger (HCIX-G, using Purolite C-100) and one gel-type anion exchanger (HAIX-G, using Purolite A-400) were loaded with iron oxide particles. Subsequently two column runs were carried out separately for arsenic removal, using these two materials. The Fe content of the HAIX-G was 60 mg/g of HAIX-G, and the Fe content of the HCIX-G was 70 mg/g of HCIX-G. The tests were carried out under identical experimental conditions. The superficial liquid velocity (SLV) was 0.60 m/h, and the EBCT was 3.9 minutes. The influent contained 100 µg/L As(V), 120 mg/L $SO_4^{2-}$, 100 mg/L $Cl^-$, 100 mg/L $HCO_3^-$, and had a pH of 7.3

Figure 8:
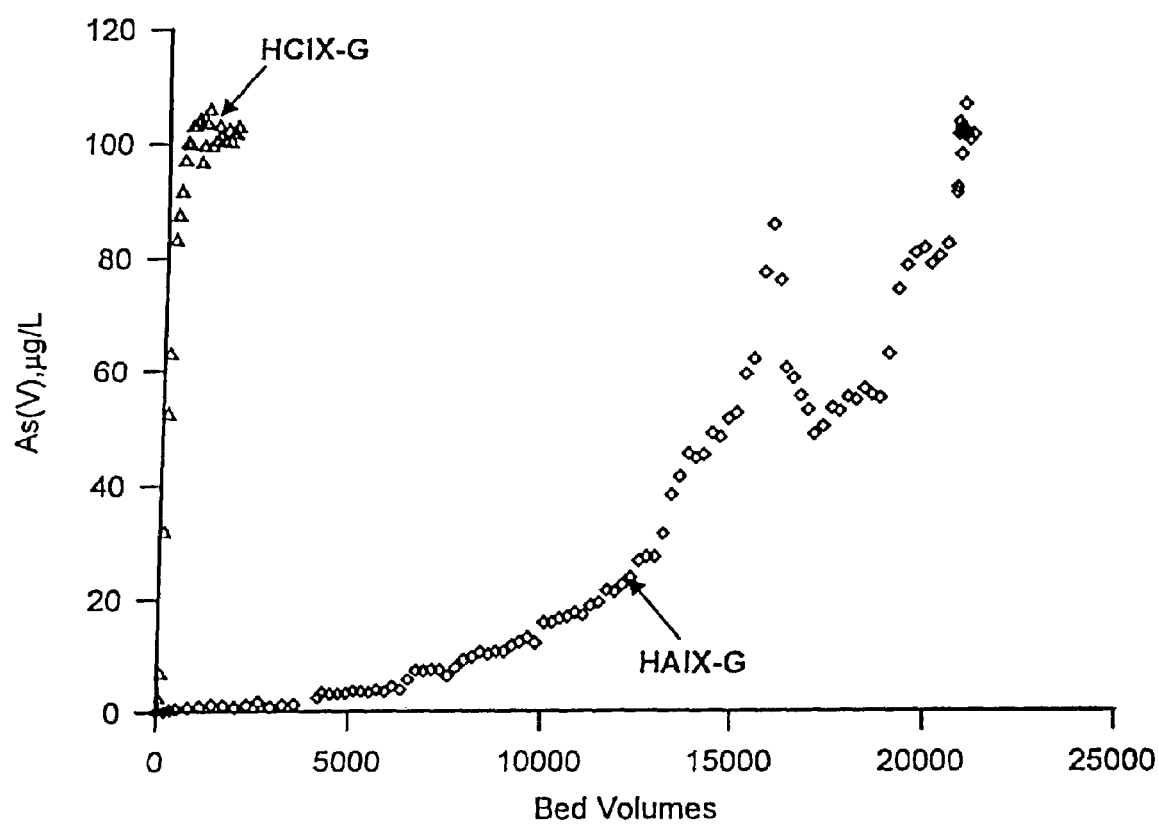
FIG. 8 is a graph comparing the effluent histories for arsenic in a hybrid gel-type cation exchanger and a hybrid gel-type anion exchanger.

FIG. 8 shows the arsenic effluent histories for the two column runs. The hybrid cation exchanger offered practically no arsenic removal, even with a slightly higher iron content; the hybrid anion exchanger, or HAIX, on the contrary removed arsenic at well over 10,000 bed volumes, all other conditions being identical.

The groundwater in Albuquerque, N.Mex. is contaminated with arsenic, and also contains a high level of dissolved silica. About twenty gallons of contaminated groundwater were collected from Albuquerque, and a column run was carried out using macroporous HAIX. The SLV was 0.83 m/h and the EBCT was 3.8 minutes. The influent contained 4.6 µg/L As(V), 33 mg/L of silica and 0.46 mg/L of phosphorus. The pH of the influent was 7.6.

Figure 9:
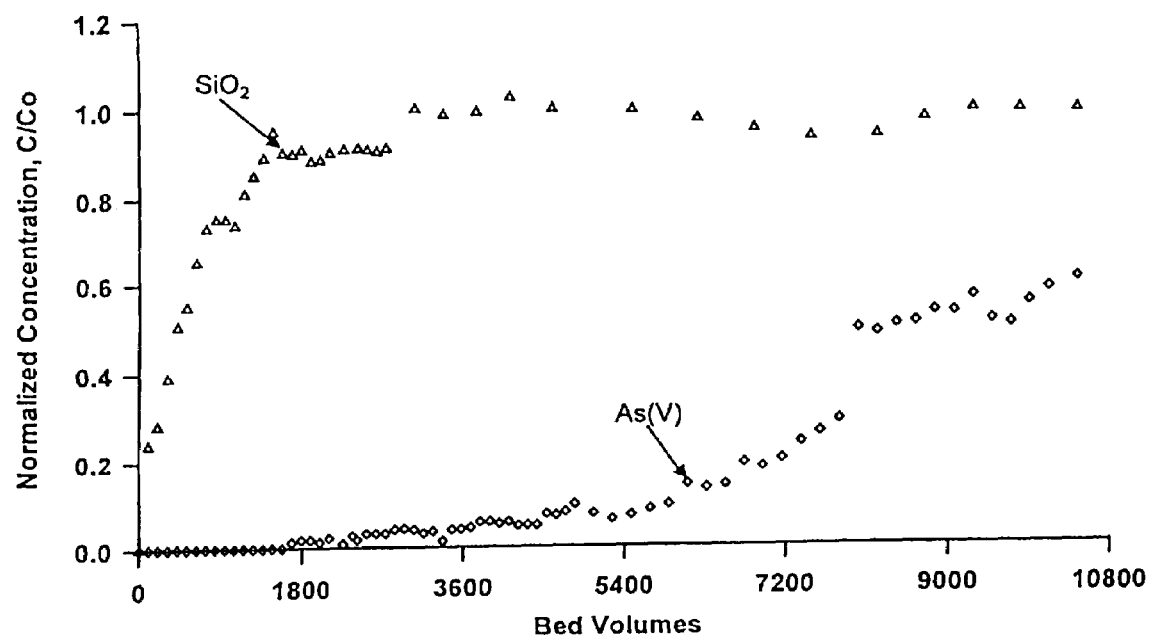
FIG. 9 is a graph comparing As(V) and silica breakthrough profiles during the treatment for groundwater using a freshly prepared, macroporous, hybrid anion exchanger.

FIG. 9 shows the effluent history for arsenic removal. Even with 33 mg/L of dissolved silica present in the contaminated water, arsenic removal was very good. Arsenic breakthrough of 10 parts per billion was observed after 7,200 bed volumes, while silica broke through from the column within 500 bed volumes.

Figure 10:
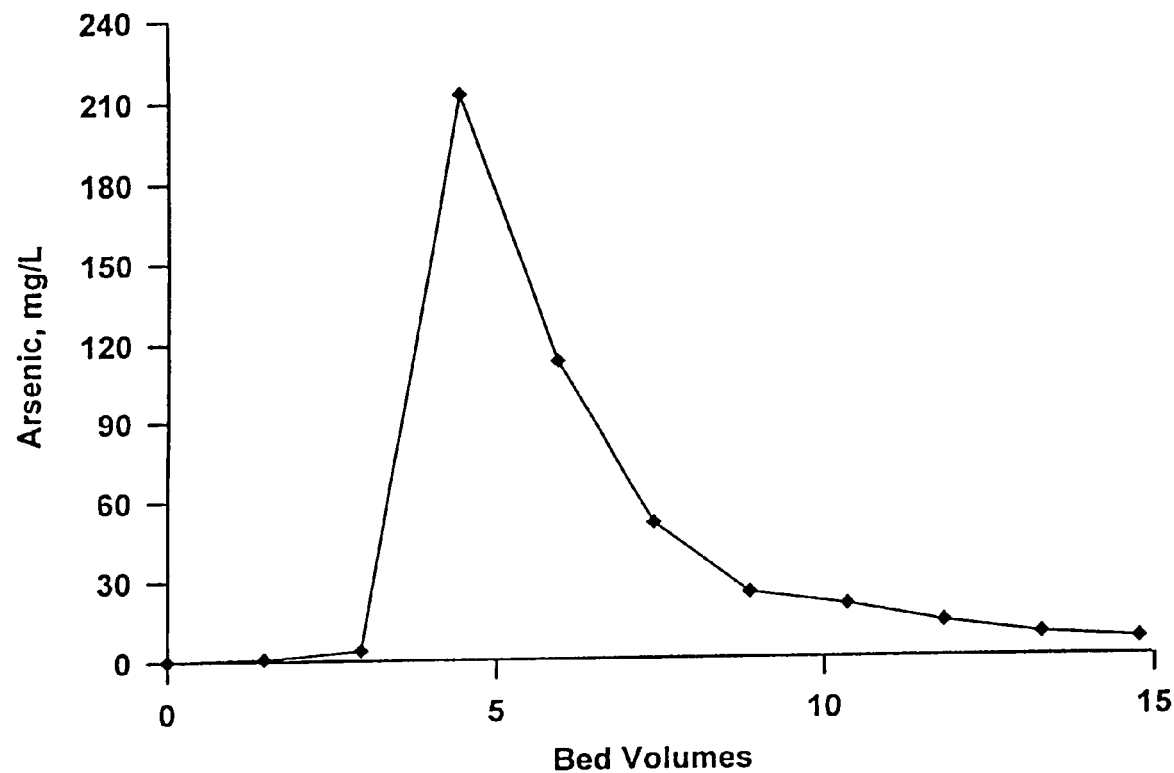
FIG. 10 is a graph illustrating the arsenic concentration profile during typical regeneration of a hybrid anion exchange resin.

An Arsenic loaded HAIX-M column can be very efficiently regenerated using a solution of 3% NaCl and 2% NaOH at a pH of 12.4 and with an EBCT of 5.6 minutes. As shown in FIG. 10, over 90% of the arsenic was desorbed within 10 bed volumes.

Figure 11:
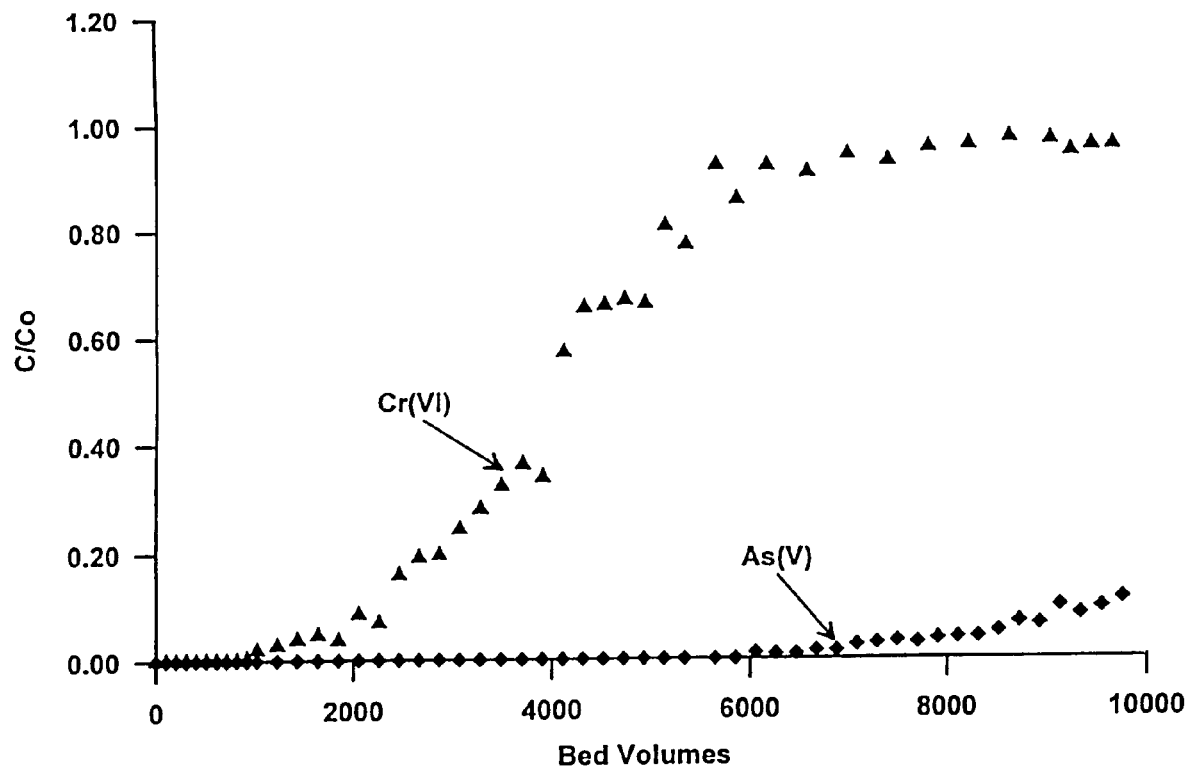
FIG. 11 is a graph of the effluent histories of As(V) an Cr(VI) during a column run using a macroporous hybrid anion exchanger.

Arsenate and Chromate can be removed simultaneously, as illustrated in FIG. 11, which illustrates the effluent histories of AS(V) and Cr(VI) during a column run with a macroporous hybrid anion exchanger (HAIX-M). Here the EBCT was 3.8 minutes. The influent was a representative feedwater containing 100 µg/L As(V), 100 µg/L Cr(VI), 120 mg/L $SO_4^{2-}$, 125 mg/L $Cl^-$, and 100 mg/L $HCO_3^-$, and had a pH of 7.1. The HAIX column was fed with the representative synthetic feed water. The HAIX column was shown to be very effective in removing both Arsenic(V) and Chromium(VI) simultaneously up to nearly 2000 bed volumes.

Figure 12:
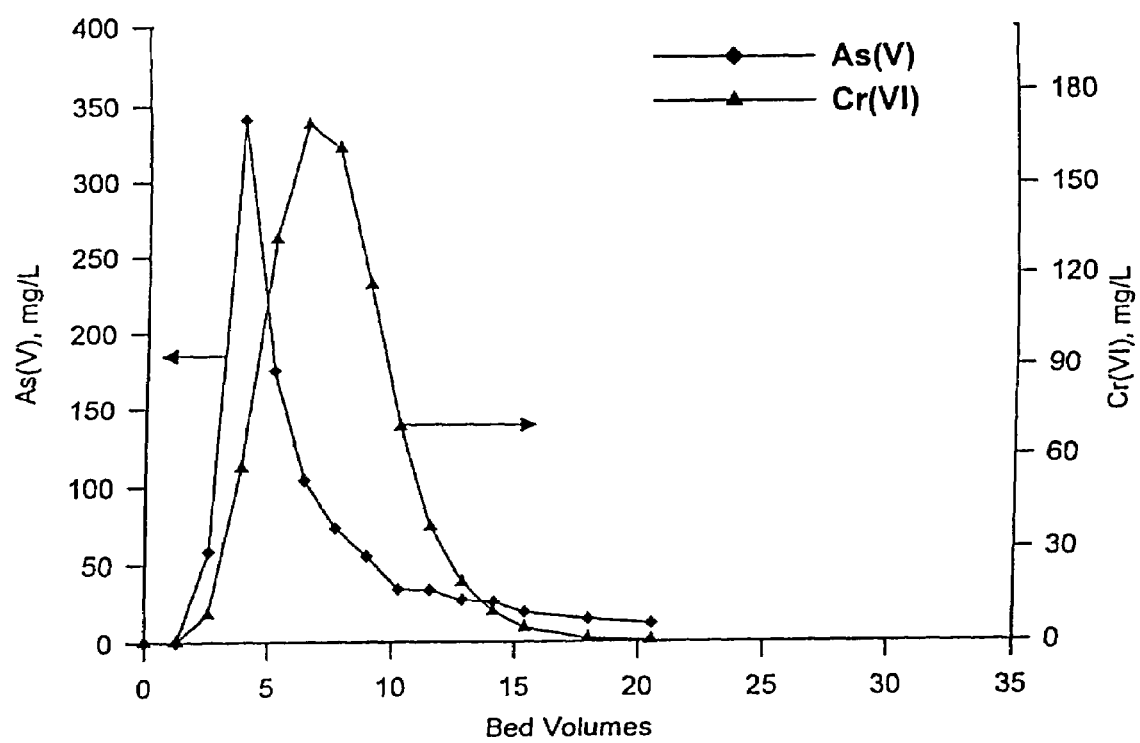
FIG. 12 is a graph showing the concentration profiles of arsenic and chromium during regeneration of a macroporous hybrid anion exchanger.

Upon exhaustion, the column was regenerated using 2% NaOH and 3% NaCl. FIG. 12 shows the concentration profiles of arsenic and chromium during regeneration of the HAIX-M at an EBCT of 3.9. The desorption of arsenate and chromate was shown to be very efficient.

Figure 13:
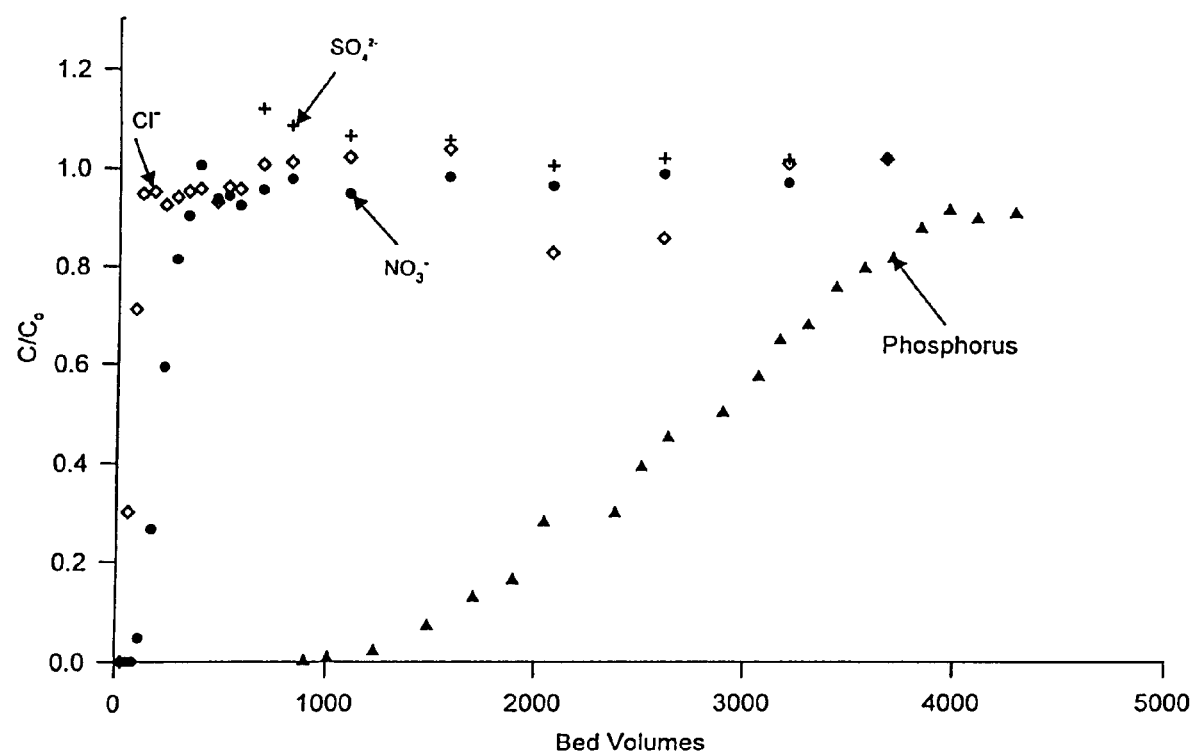
FIG. 13 is a graph showing breakthrough profiles for phosphorous and other anions during a column run using a macroporous hybrid anion exchanger.

FIG. 13 illustrates the removal of phosphate using the hybrid anion exchanger. A HAIX column was fed with a feed solution containing phosphate along with other commonly encountered anions. Specifically the influent contained 4.43 mg/L phosphate (as P), 90 mg/L Cl$^-$, 42 mg/L $SO_4^{2-}$, 56 mg/L $NO_3^-$, and 78 mg/L $HCO_3^{1-}$, and had a pH of 7.1. the EBCT was 3.3 minutes. The effluent history for P, as depicted in FIG. 13, confirms the ability of HAIX to remove phosphate selectively in the presence of other competing anions, namely, chloride and sulfate.

Figure 14:
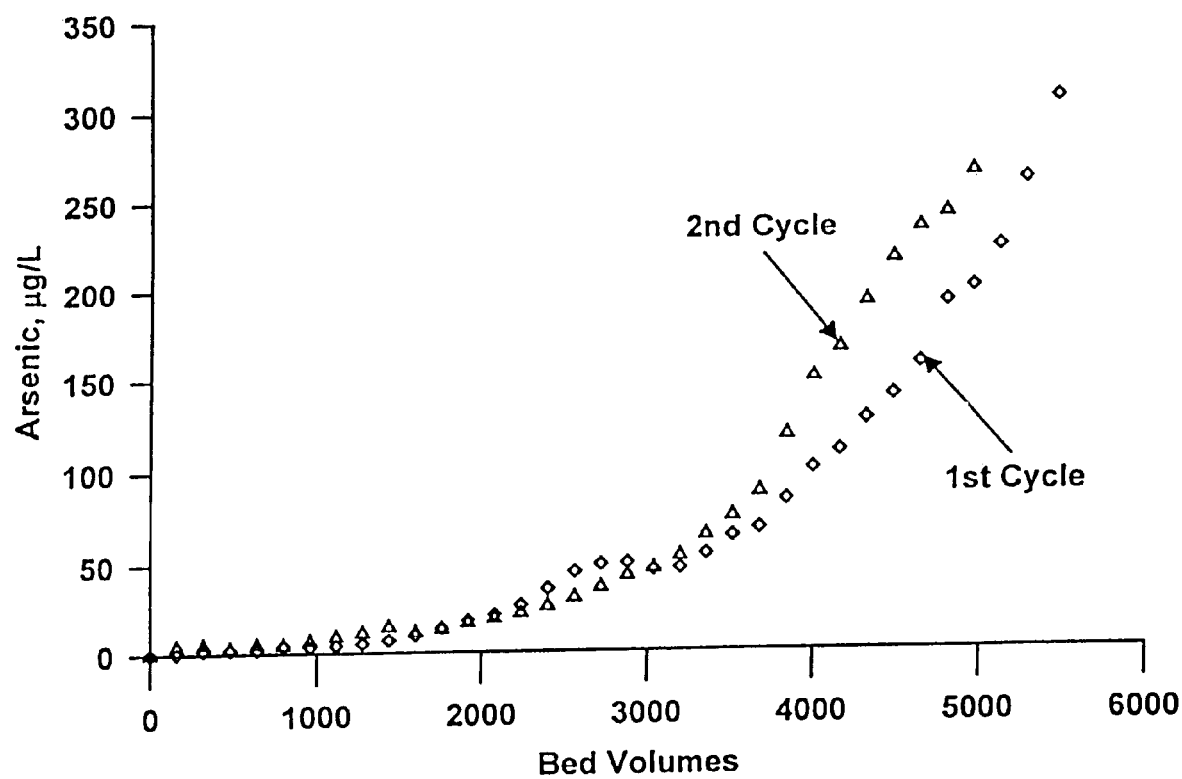
FIG. 14 is a graph showing the effluent histories for arsenic during two consecutive column runs using a macroporous hybrid anion exchanger with the same contaminated groundwater feed.

One HAIX column was run for three successive cycles. After each cycle, the column was regenerated with 2% NaOH and 3% NaCl. FIG. 14 shows the effluent histories for arsenic in two successive column runs using groundwater collected from a contaminated site in Ontario, Canada. The SLV was 1.58 m/h and the EBCT was 1.56 minutes. The influent contained 430 μg/L As, 280 μg/L P, 3.0 mg/L TOC, 11.9 mg/L $SO_4^{2-}$, 6.4 mg/L Cl$^-$, 21.9 mg/L $NO_3^-$, and had a pH of 7.2. The arsenic effluent histories remained essentially the same. These results provide evidence that HAIX can be regenerated and reused for multiple cycles without a significant loss in arsenic removal capacity.

Figure 15:
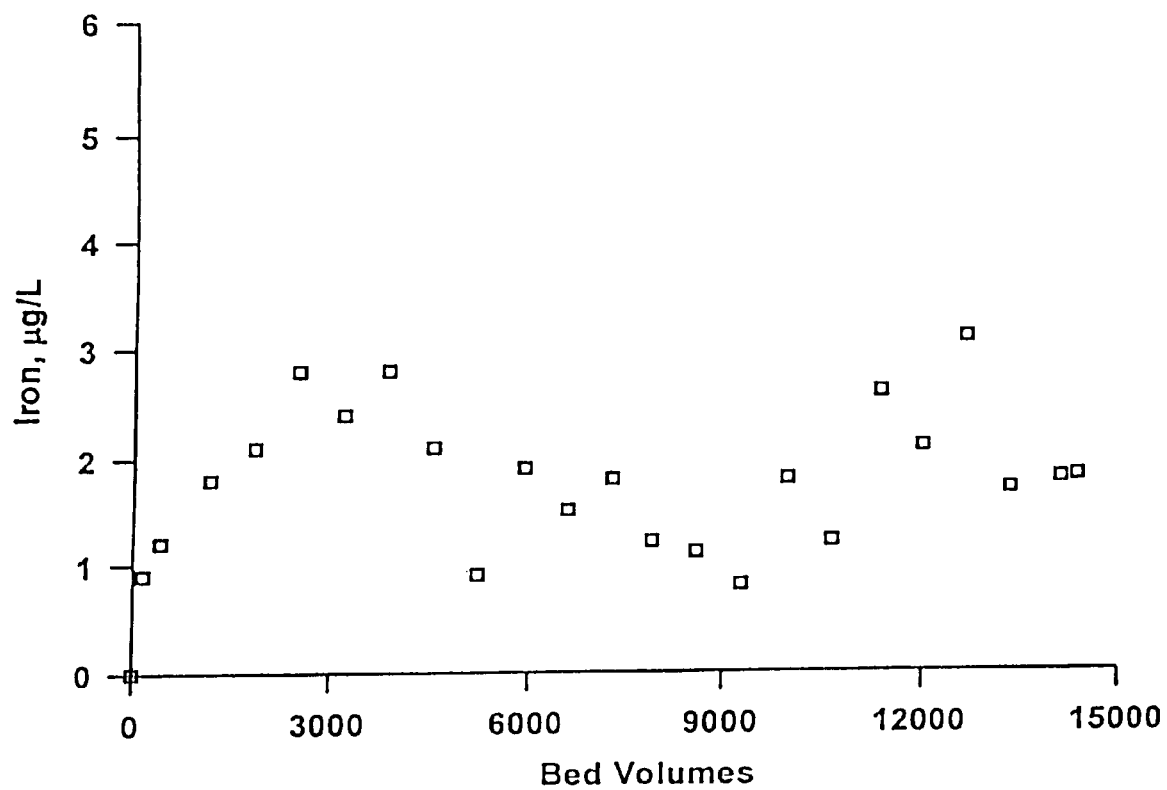
FIG. 15 is a graph showing the concentration of iron in the effluent during a column run using macroporous hybrid anion exchanger particles

FIG. 15 shows the concentration of total iron released during a lengthy column run under conditions in which the SLV was 0.70 m/h and the EBCT was 4.5 minutes. The influent contained 100 μg/L As(III), 170 mg/L $SO_4^{2-}$, 90 mg/L Cl$^-$, 100 mg/L $HCO_3^-$, and had a pH of 6.2. The iron concentration at the exit of the column was quite low (less than 3 μg/L) for nearly 15,000 bed volumes. The loss of iron from HAIX is negligible (30 μg/g HAIX-M) compared to its total capacity (120-150 mg Fe/g HAIX).

Figure 16A:
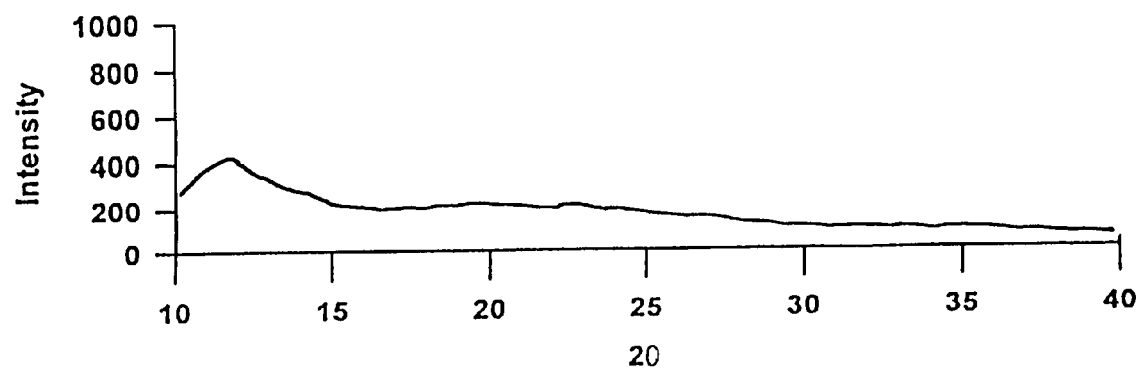
FIGS. 16(a) and 16(b) are x-ray diffractograms of freshly prepared, and used, hybrid anion exchange particles, respectively.
Figure 16B:
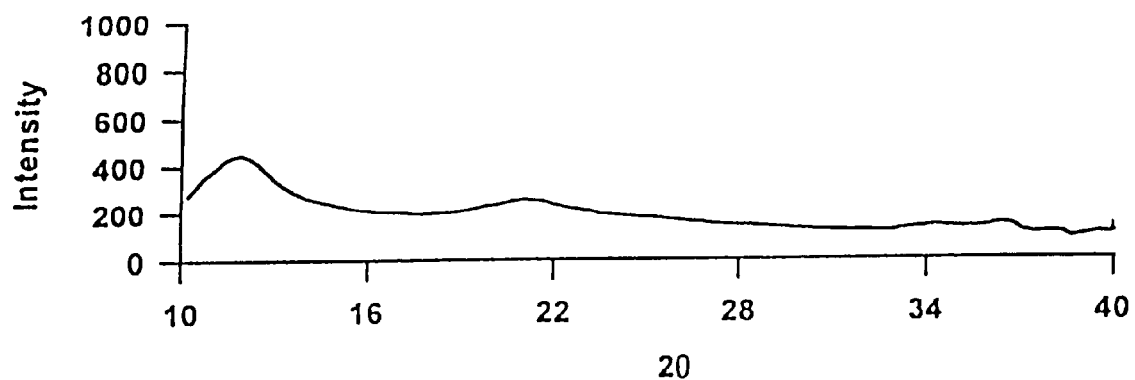

It is plausible that, with aging and continued usage, amorphous HFO particles could gradually become more crystalline leading to the formation of goethite, hematite, etc. However, FIGS. 16A and 16B show a comparison of X-ray diffraction (XRD) patterns of freshly prepared (FIG. 16A) versus used (FIG. 16B) HAIX samples. Both patterns are quite similar, with very minor changes. It is unlikely that HFO nanoparticles embedded in the anion exchanger underwent any structural changes.

Figure 17:
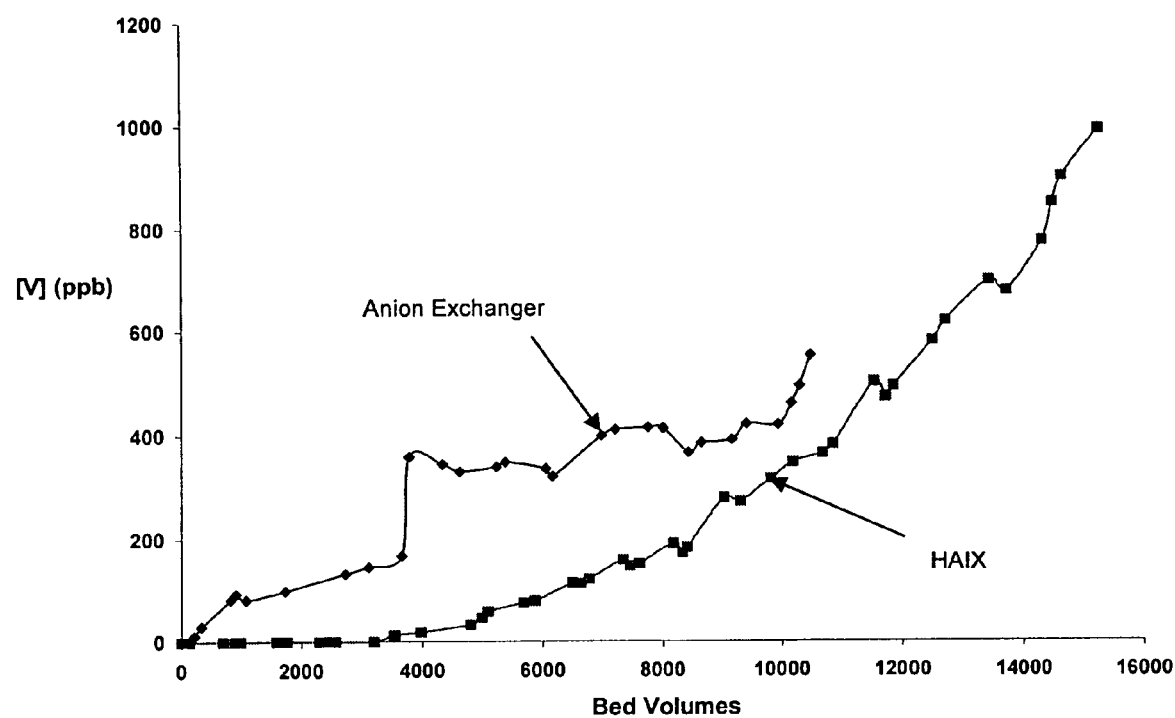
FIG. 17 is a graph showing a comparison of vanadate effluent histories for a hybrid anion exchanger and a parent anion exchanger.

FIG. 17 illustrates the performance of a hybrid anion exchanger in accordance with the invention in removing Vanadate from tap water spiked with 3 mg/L Vanadate as V. Two effluent histories are shown, one for the parent anion exchanger, and the other for the hybrid anion exchange material. As shown by the graph, the vanadate almost immediately began to pass through the parent anion exchanger, whereas, in the case of the hybrid anion exchange material, measurable amounts of vanadate began to be detected only after about 3000 bed volumes, and remained at a level below 200 parts per billion at 8000 bed volumes.

Figure 18:
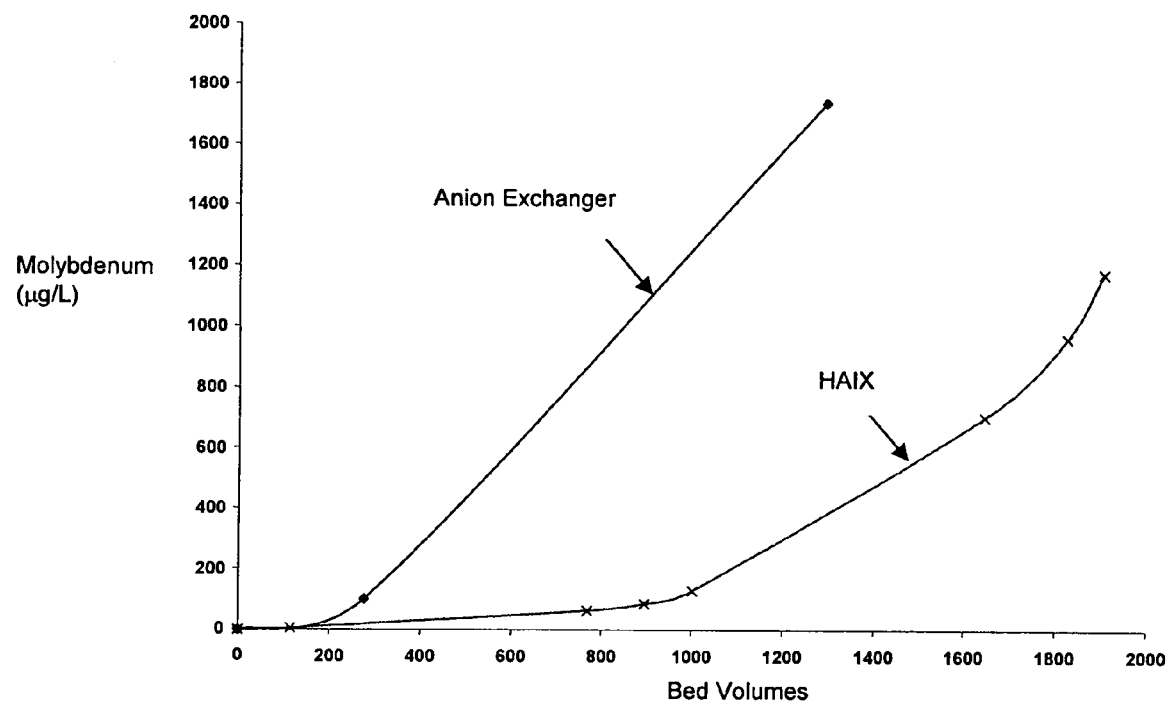
FIG. 18 is a graph showing a comparison of molybdate effluent histories for a hybrid anion exchanger and a parent anion exchanger.

Performance of the hybrid anion exchanger in accordance with the invention in the removal of molybdates was also effective as shown by FIG. 18. Two column runs were carried out, one using the parent anion exchanger and the other using the hybrid anion exchanger, on an influent consisting of tap water spiked with 3 mg/L of Molybdate as Mo. With the parent anion exchanger, Molybdate began to break through at about 100 bed volumes, and rose from a level of about 100 μg/L at about 300 bed volumes to about 1700 μg/L at 1300 bed volumes. On the other hand, in the case of the hybrid anion exchanger, Molybdate remained at a level below 100 μg/L up to about 1000 bed volumes and rose only to about 400 μg/L at 1300 bed volumes.

Numerous modifications can be made to the invention as described. As indicated previously, any of a wide variety of anion exchange resins can be used to carry out the selective removal of ligands. For example, as alternatives to strong base anion exchange resins having quaternary ammonium functional groups with a positively charged nitrogen atom, other anion exchange materials can be used, such as weak base organic ion exchange resin beads containing primary, secondary or tertiary amine groups or a mixture thereof; organic ion exchange resin beads having a polystyrene or polystyrene/divinylbenzene matrix; organic ion exchange resin beads having a polyacrylic matrix; organic or inorganic membranes; and polymeric fiber or fibrous anion exchange materials.

In principle, any anionic oxidizing agent can be used in place of permanganate. For example, in addition to hypochlorite, mentioned previously, other anionic oxidants, for example persulfates, bromates and iodates, may be used. The intermediate, produced by reacting the anion exchange material with an anionic oxidant, may be reacted with a solution of an oxidizable salt of a metal, preferably a ferrous salt such as ferrous sulfate, ferrous ammonium sulfate, ferrous chloride or ferrous acetate. The hydrated iron oxide particles precipitated in the anion exchange material can take various forms, such as hematite, geothite, magnetite and ferrihydrite.

Still other modifications may be made to the apparatus and method described above without departing from the scope of the invention as defined in the following claims.

The invention claimed is:

1. A method for synthesizing a selective adsorbent, the method comprising the steps of:
   reacting a material that exhibits anion exchange behavior with an anionic oxidant to produce an intermediate; and
   reacting, with said intermediate, a solution of a salt of a metal, said salt being capable of being oxidized, thereby precipitating and dispersing a salt of said metal throughout the intermediate by the action of the oxidant and producing an adsorbent capable of exchanging anions.

2. A method according to claim 1, in which the step of reacting said material that exhibits anion exchange behavior with an anionic oxidant is carried out by passing a solution of said anionic oxidant through said material, and in which the step of reacting a solution of a salt of a metal with said intermediate is carried out by passing a solution of said salt through said intermediate.

3. A method according to claim 1, in which the step of reacting a solution of a salt of a metal with said intermediate is followed by the step of washing the adsorbent with an organic solvent.

4. A method according to claim 1, in which the step of reacting a solution of a salt of a metal with said intermediate is followed by the step of washing the adsorbent with acetone.

5. A method according to claim 1, in which the step of reacting a solution of a salt of a metal with said intermediate is followed by the steps of washing and drying the adsorbent.

6. A method according to claim 1 in which, in preparing said selective adsorbent, said steps of reacting a material that exhibits anion exchange behavior with an anionic oxidant, and reacting a solution of a salt of a metal with said intermediate, are repeated.

7. The method according to claim 1, in which said material that exhibits anion exchange behavior is a polymeric anion exchange resin.

8. The method according to claim 1, in which said material that exhibits anion exchange behavior comprises weak base organic ion exchange resin beads containing primary, secondary or tertiary amine groups or a mixture thereof.

9. The method according to claim 1, in which said material that exhibits anion exchange behavior comprises strong base organic ion exchange resin beads containing quaternary ammonium groups with a positively charged nitrogen atom.

10. The method according to claim 1, in which said material that exhibits anion exchange behavior comprises organic ion exchange resin beads having a polystyrene or polystyrene/divinylbenzene matrix.

11. The method according to claim 1, in which the precipitated and dispersed salt of said metal is an oxygen-containing compound of iron.

12. The method according to claim 1, in which the solution of a salt of a metal is a solution of ferrous salt.

13. The method according to claim 1, in which said anionic oxidant is a permanganate.

14. The method according to claim 1, in which said anionic oxidant is a hypochlorite.

15. An adsorbent for the selective removal of ligands from fluids, said absorbent comprising a polymeric anion exchange resin containing particles of an oxygen-containing compound of iron dispersed throughout the resin.

* * * * *